United States Patent [19]
Lippert et al.

[11] 3,969,107
[45] July 13, 1976

[54] COMBINED PROCESS FOR WORKING UP PURE AND COMPLEX COPPER CONCENTRATES

[75] Inventors: Karl Lippert; Herbert Kudelka, both of Duisburg, Germany

[73] Assignee: Duisburger Kupferhutte, Duisburg, Germany

[22] Filed: June 4, 1975

[21] Appl. No.: 583,828

[30] Foreign Application Priority Data
June 14, 1974 Germany............................ 2428793

[52] U.S. Cl............................... 75/101 R; 75/105; 75/117; 75/118 R; 75/114; 75/120
[51] Int. Cl.² .................. C22B 13/04; C22B 11/04; C22B 15/08
[58] Field of Search................. 75/101 R, 114, 105, 75/117, 118 R, 120

[56] References Cited
UNITED STATES PATENTS

| | | | |
|---|---|---|---|
| 2,777,764 | 1/1957 | Hedley et al.......................... | 75/105 |
| 2,927,017 | 3/1960 | Marvin.............................. | 75/117 X |
| 3,174,848 | 3/1965 | Bruce................................ | 75/118 X |
| 3,793,429 | 2/1974 | Queneau et al.................. | 423/41 X |
| 3,880,732 | 4/1975 | Sardisco............................ | 75/101 R |

Primary Examiner—G. Ozaki
Attorney, Agent, or Firm—Burgess, Dinklage & Sprung

[57] ABSTRACT

A process for working up of a concentrate containing Cu, Zn, and precious metal including at least one of Ag or Au. In a first stage, the concentrate or the concentrate in modified form is leached for hydrometallurgically dissolving out the copper and zinc and leaving a residue containing the precious metal, and the leach liquor is separated from the residue. In a second stage, residue is subjected to a chlorinating sulfatizing roasting, and the roasted residue is leached with a selective solvent for the precious metal, e.g. aqueous NaCl, for dissolving the precious metal out of the residue.

8 Claims, No Drawings

COMBINED PROCESS FOR WORKING UP PURE AND COMPLEX COPPER CONCENTRATES

BACKGROUND

The present invention relates to a process for the complete working up of concentrates, containing Cu, Zn, Ag, and possibly Au, in particular, by means of combined extraction and leaching processes.

During the past years the hydrometallurgical working up of copper concentrates as well as of complex copper-zinc concentrates has increasingly gained in importance. In comparison with pyrometallurgical processes, these hydrometallurgical ones have the advantages of higher flexibility and selectivity and, frequently, also of higher non-ferrous metal yields. What is of great weight is the fact that they are favorable to the environment.

These hydrometallurgical processes can be divided into three categories, viz. direct leaching, leaching after activating pretreatment, and leaching after sulfatizing (disintegrating) roasting. In each case there is obtained a metal solution, worked up in known manner to its non-ferrous metals or their salts, and a leaching residue. As extraction never is a hundred percent, these residues partially contain considerable amounts of non-ferrous metals, and, in particular, they always contain the whole, or almost the whole, of the original (primary) precious metal contents.

Relatively little is reported on the working up of leaching residues in the numerous publications in the art and in the numerous patents dealing with the various hydrometallurgical extraction processes. If there is any reference at all, it is to the recovery of the valuable constituents in the residues preferably by means of flotation and/or cyanide leaching. Generally speaking, the yields, thus obtained, are unsatisfactory.

Thus, for example, there was obtained by means of ammonia pressure extraction of a copper-zinc ore (see Canad. Mining Metallurg., Bull. 1964, Aug., pp. 857-866) a leaching residue that contained the whole of the silver and gold as well as 4.4 percent of the original (primary) copper contents. The precious metal yield, obtained by different techniques of cyanide leaching was within a range of 55-66% of the silver and 27-88% of the gold.

In the extraction of various sulfide copper concentrates after ammonia leaching under normal pressure, known in the literature of the art as the Arbiter process (see Kuhn, M. C., N. Arbiter and H. Kling: Anaconda's Arbiter Process for Copper, Paper to Hydrometallurgy Sect. of the CIM, Oct. 1, 1973, in Edmonton, Canada), flotation of the leaching residues made it possible for a total yield to be obtained of about 70-90% of the silver and 96-97% of the copper.

Both processes, mentioned above, belong to the category of direct leaching techniques. Their development has reached the state of pilot plants; a commercial plant, which is to be operated in accordance with the Arbiter process, is under construction.

In the extraction of a copper-zinc concentrate by means of sulfatizing (disintegrating) roasting in a fluidized bed reactor and subsequent leaching with diluted sulfuric acid in a plant with a throughput of 2,400 tons per month of concentrate (see Transactions AIME 203 (1955), Aug., pp. 634-638), there remained in the leaching residue 6% of the copper and 12% of the original (primary) zinc contents in addition to the whole of the precious metal content. By means of flotation of the residue it was possible for 20% of its gold content, 60% of its silver content, 30% of its copper content, and 60% of its zinc content to be separated. The flotation concentrate was conveyed into a copper shaft furnace for the purpose of recovering the copper and precious metals contained. There is also a description of the working up of a copper concentrate by means of sulfatizing roasting with an addition of lime for the purpose of preventing an emission of $SO_2$ (see Mining Engng. 1972, June, p. 52). Leaching of the roasted material with diluted sulfuric acid having been effected, there remain in the residue the whole of the precious metal content as well as 1.4% of the copper. By means of the cyanide leaching, the gold was almost completely extracted, with only 49% of the silver and none of the copper being extracted. This research work was done on a laboratory scale only.

A completely different process for working up the residue is suggested in another publication (see Griffith, W. A. et al: Development of the Roast-Leach-Electrowin Process for Lakeshore; Paper A 73-64 to AIME 1973 Annual Meeting). In a 5-ton-per-day pilot plant, chalcopyrite was was extracted by means of sulfatizing roasting. On an average, 3.8% of the copper remained in the leaching residue as did the precious metals. The leaching residue was then reduced with the aid of carbon to sponge iron which was used for the cementation of the copper obtained from the direct leaching of oxide ores; thus, the valuable constituents, contained in the residue, are conveyed into the cement copper. There are no data on the yield thus obtained. The process appears to have been especially developed for the simultaneous working up of oxide and sulfide copper ores, i.e. it cannot be applied generally. Moreover, it appears to be rather expensive and complicated.

The working up of sulfide non-ferrous metal concentrates by means of sulfatizing (disintegrating) roasting in a fluidized bed reactor with subsequent non-ferrous metal extraction by means of acid leaching, which is described in the three last-mentioned examples of the level reached by the technology, has come to be very widely used on a commercial scale.

Generally speaking, as a compilation of the hydrometallurgy of copper concentrates has it (see Dasher, J., Hydrometallurgy for Copper Concentrates, Paper to 2nd Hydrometallurgy Group Meeting, Canadian Institute of Mining and Metallurgy, CIL House, Montreal, Oct. 2-3, 1972), up to 97% of the non-ferrous metals can be extracted with the aid of acid subsequent to sulfatizing roasting, with the precious metals normally remaining in the leaching residue.

In a survey of the known hydrometallurgical processes for the working up of copper concentrates and of the stage of development, reached in 1972, the difficulty of recovering precious metals from the leaching residues is also pointed out (see Canad. Metallurg. Quart. 11 (1972) 2, pp. 387-400). All the processes, mentioned above as examples, also make it clear that the working up of the leaching residues to recover the residual non-ferrous and precious metals can only be effected in an unsatisfactory manner.

The concentrates treated in the process of the invention are copper concentrates, copper-zinc concentrates and copper-zinc-lead concentrates.

THE INVENTION

The process in accordance with the present invention for the complete working up of concentrates, containing Cu, Zn, Pb, Au, and Ag in particular, by means of combined extraction and leaching processes, does not have the disadvantages mentioned above. It has the following features: in a first stage the concentrates are extracted by known hydrometallurgical processes, with the concentrates being leached directly or subsequent to activating pretreatment or subsequent to sulfatizing roasting; then they are filtered, with the filtered solutions being worked up in the known manner; in a second stage the residual valuable metallic constituents, still contained in the leaching residues, are further extracted by means of modified chlorinating sulfatizing roasting (CR), with the roasted material, thus obtained, being extracted with the aid of suitable solvents and the solutions being worked up for the purpose of recovering the metals.

This CR is effected in a generally known manner, there being certain modifications with regard to individual parameters such as, for example, feed height and rabbling velocity. Little does the excellent quality of CR extraction depend upon the amounts of non-ferrous and precious metals contained in the leaching residues mentioned above, i.e. these amounts may vary within wide limits. It follows from this fact that in the primary extraction processes the yield can be permitted to be low, i.e. retention time can be reduced or, to put it positively, throughput can be improved if the leaching residues are subsequently extracted by means of CR.

Hence, not only does the combination of the two extraction processes in accordance with the present invention effect a better valuable metal yield, it also has the advantage of improved economy due to a higher throughput of material in the first stage.

The extraction of the valuable constituents, extracted by means of CR, can be effected with the aid of extraction solvents in one stage or in several stages. The mode of operation to be chosen will be determined in particular by the kind and amount of extracted valuable constituents present in the roasted material.

If the leaching residues, obtained in the first stage of the hydrometallurgical extraction processes, contain none, or only small amounts, of such elements as impair the quality of an iron ore, such as for example, arsenic, antimony, tin or lead, the second stage, viz. the extraction of residual amounts of valuable metallic constituents by means of CR, can be operated in such a manner as to add corresponding proportions of the leaching residues to pyrites cinders which are then jointly extracted by means of CR. The leaching residues of these roasted materials can then be utilized as PO (purple ore) as usual.

Thus, the invention provides a process for working up of a concentrate containing copper, zinc and precious metals, including at least one of silver and gold, which comprises a two-stage treatment. In the first stage, the concentrate is leached, either as such or after a pre-treatment or after a sulfatizing roasting thereof, for hydrometallurgically dissolving out the copper and zinc and leaving a residue containing the precious metal. The leach liquor is then separated from the residue. Thereafter, in the second stage, the residue is subjected to a chlorinating sulfatizing roasting, after which it is leached with a selective solvent for the precious metal for dissolving the precious metal out of the residue.

Elemental sulfur may be formed in the first stage leaching, and included in the first stage residue. It can be separated from the first stage residue before proceeding to a second stage, by, for example, flotation, distillation or extraction such as with ethylene chloride.

The solvent utilized in the second stage can be an alkali or alkali earth chloride aqueous solution. The solution can be a 10 – 25 wt. % NaCl or a 10 – 35 wt. % $CaCl_2$ salt solution. It can be weakly acid (pH of ~ 2), with the acidity being provided by mineral acid such as hydrochloric acid or sulfuric acid. Instead of the salts mentioned the salt can be an alkali or alkali earth cyanide. Where the salt is the halide, the precious metal and also the lead is dissolved in the leaching step. Where the cyanide is used, the lead is not dissolved, while the precious metal, e.g. the silver, is dissolved.

Where the precious metal includes gold, it is desirable to have an oxidizing agent present during the second stage leaching. The oxidizing agent serves to change gold into a soluble form. It can be provided by passing chlorine gas through the material being leached.

Where the concentrate includes lead and silver, the roasted residue produced in the second stage, i.e. the residue removed from the chlorinating sulfatizing roast, prior to the aforementioned second stage leaching with a selective solvent, can advantageously be leached with dilute acid for extraction of non-ferrous metals other than silver and lead and formation of a residue containing silver and lead. The resulting residue can then be leached with said selective solvent. The dilute acid used in the second stage can be an inorganic acid, e.g. sulfuric acid, of pH ~ 2. If the selected solvent is an aqueous alkali or alkali earth chloride, the silver and lead will be selectively dissolved. If the solvent is a cyanide solution, silver will be selectively dissolved thereby.

Where a pre-treated concentrate is introduced into the first stage, the pre-treatment can be for instance an activating grinding.

In the chlorinating sulfatizing roasting (CR) those valuable constituents, not recovered in the first stage, are now almost completely extracted by reaction with $SO_3$, HCl and $Cl_2$ which are formed during CR.

In the examples which follow, the concentrate is first subjected to a sulfatizing roasting. The effect of the sulfatizing roasting is the transforming of the Cu and Zn contents for the most part into sulfates and for a very small part into oxides, which are soluble up to 96 – 98% in mineral acids.

The sulfatizing roasting step prior to the first stage could be eliminated and either the concentrate as such or after a pre-treatment as is described above, could be introduced into the first stage.

The following examples are to illustrate the combination of processes in accordance with the present invention which, however, are not limited to these examples.

EXAMPLE 1

A conventional Cu-Zn concentrate, containing 17.1% Cu, 10.3% Zn, 6.2% Pb, 23.0% Fe, 36.5% S, 450 g/t Ag, and 2.3 g/t Au, was subjected to a conventional sulfatizing roasting in a laboratory fluidized bed reactor and subsequently leached with agitation with diluted (2%) sulfuric acid. From 1.0 kg of concentrate there were obtained 470 g of leaching residue (I), containing 0.82% Cu, 0.80% Zn, 13.4% Pb, 48.6% Fe, 0.13% S''-S (sulfidic sulfur), 960 g/t Ag, and 4.9 g/t Au, which correspond to a yield of 97.7% Cu and 96.4% Zn. Ag and Au were not recovered, nor was Pb.

After an addition of 12% NaCl and 2% S''-S (in the form of ironstone), the leaching residue (I) was subsequently subjected to a chlorinating sulfatizing roasting. 1 kg of roasted material was subsequently leached with agitation in 5 l of weakly acid (pH of ~ 2), aqueous 20% NaCl solution for twenty minutes, with 2 l/h $Cl_2$ being passed through; subsequently it was filtered.

There were obtained 690 g of leaching residue (II), containing 0.27% Cu, 0.10% Zn, 0.11% Pb, 62.4% Fe, 21 g/t Ag; and below 0.2 g/t Au, which correspond to a yield of 71.7% Cu, 89.2% Zn, 99.3% Pb, 98.1% Ag, and over 96.5% Au (related to the amounts contained in the leaching residue (I)). The recovered values can be separated from the leach liquor by conventional procedures.

The total valuable metal yield thus amounted to 99.4% Cu, 99.6% Zn, 99.3% Pb, 98.1% Ag, and over 96.5% Au.

EXAMPLE 2

A conventional Cu-Zn concentrate, containing 8.9% Cu, 16.0% Zn, 4.2% Pb, 20.7% Fe, 34.0% S, and 706 g/t Ag, was subjected to a conventional sulfatizing roasting in a laboratory fluidized bed reactor, with the roasted material subsequently being leached with agitation with diluted (2%) sulfuric acid. From 1 kg of concentrate there were obtained 510 g of residue (I), containing 2.90% Cu, 3.90% Zn, 8.25% Pb, 40.5% Fe, 0.85% S''-S, and 1,390 g/t Ag, which corresponded to a yield of 83.4% Cu and 87.6% Zn. Ag and Pb were not recovered.

This residue (I) was admixed with 12% NaCl and 2% S''-S in the form of ironstone, subjected to a conventional chlorinating sulfatizing roasting, and then extracted as follows;

1. 1 kg of roasted material was subjected to agitation leaching in a 0.7 l of diluted (2%) sulfuric acid, filtered in a filtering flask, and washed with as much $H_2O$ as was required for 0.8 l of filtrate to be obtained. The residue (II, 800 g in weight) still contained 0.119% Cu, 0.264% Zn, 8.20% Pb, 45.7% Fe, and 1,350 g/t Ag; the filtrate contained 27 g/l Cu, 36 g/l Zn, 0.38 g/l Pb, and 0.030 g/l Ag.

Related to the residue (I), these values corresponded to a yield of 95.9% Cu, 93.2% Zn, 0.5% Pb, and 3% Ag. The silver and the lead, present as chlorides and sulfates, respectively, after chlorinating sulfatizing roasting, only have a relatively low degree of solubility in the extraction solution in this leaching stage.

Thus, the total valuable metal yield, related to the starting concentrate, amounted to 99.3% Cu, 99.1% Zn, and 3% Ag.

2. For the purpose of extracting the residual Ag content from the residue (II), this residue (II) was leached, with agitation, with 2.5 liters of a 0.5% aqueous KCN solution for one hour, after which it was filtered. The leaching residue (III, 99 percent in weight of II) still contained 51 g/t Ag, which corresponded to a 96.2% yield, related to the Ag content in II. The silver present in the filtrate can be recovered in a conventional recovery.

Thus, the total Ag yield amounted to 96.3%.

In this leaching stage, the whole of the lead remained in the residue. Subsequently, it could be separately extracted with, for example, NaCl solution or diethyl triamine.

What is claimed is:

1. A process for working up of a concentrate containing Cu, Zn, and precious metal including at least one of Ag or Au, which comprises:
   a. in a first stage, leaching the concentrate, the concentrate activated by a pre-treatment, or the concentrate after sulfatizing roasting thereof, for hydrometallurgically dissolving out the copper and zinc and leaving a residue containing the precious metal, and separating the leach liquor from the residue, and
   b. in a second stage, subjecting the residue to a chlorinating sulfatizing roasting, and leaching the roasted residue with a selective solvent for the precious metal for dissolving the precious metal out of the residue.

2. Process of claim 1, wherein elemental sulfur is formed during the first stage leaching and is included in the first stage residue, and the step of separating such elemental sulfur from first stage residue before the second stage.

3. Process of claim 1, wherein said solvent is an alkali or alkali earth chloride aqueous solution.

4. Process of claim 1, wherein said concentrate includes Pb and said precious metal includes Ag and the roasted residue produced in the second stage prior to said leaching with a selective solvent, is leached with dilute acid for extracting non-ferrous metals other than silver and lead and formation of a residue containing the silver and lead, and leaching said residue containing the silver and lead with said solvent.

5. Process of claim 4, wherein said solvent is an aqueous alkali or alkali earth chloride solution and the silver and lead are selectively dissolved thereby.

6. Process of claim 4, wherein said solvent is an aqueous cyanide solution and silver is selectively dissolved thereby.

7. Process of claim 1, said precious metal including Au, and wherein in said leaching of the roasted residue, an oxidizing agent is present.

8. Process of claim 1, wherein the concentrate includes Pb.

* * * * *